N. AMES.
Strainer for Coffee Pot.
No. 33,316. Patented Sept. 17, 1861.
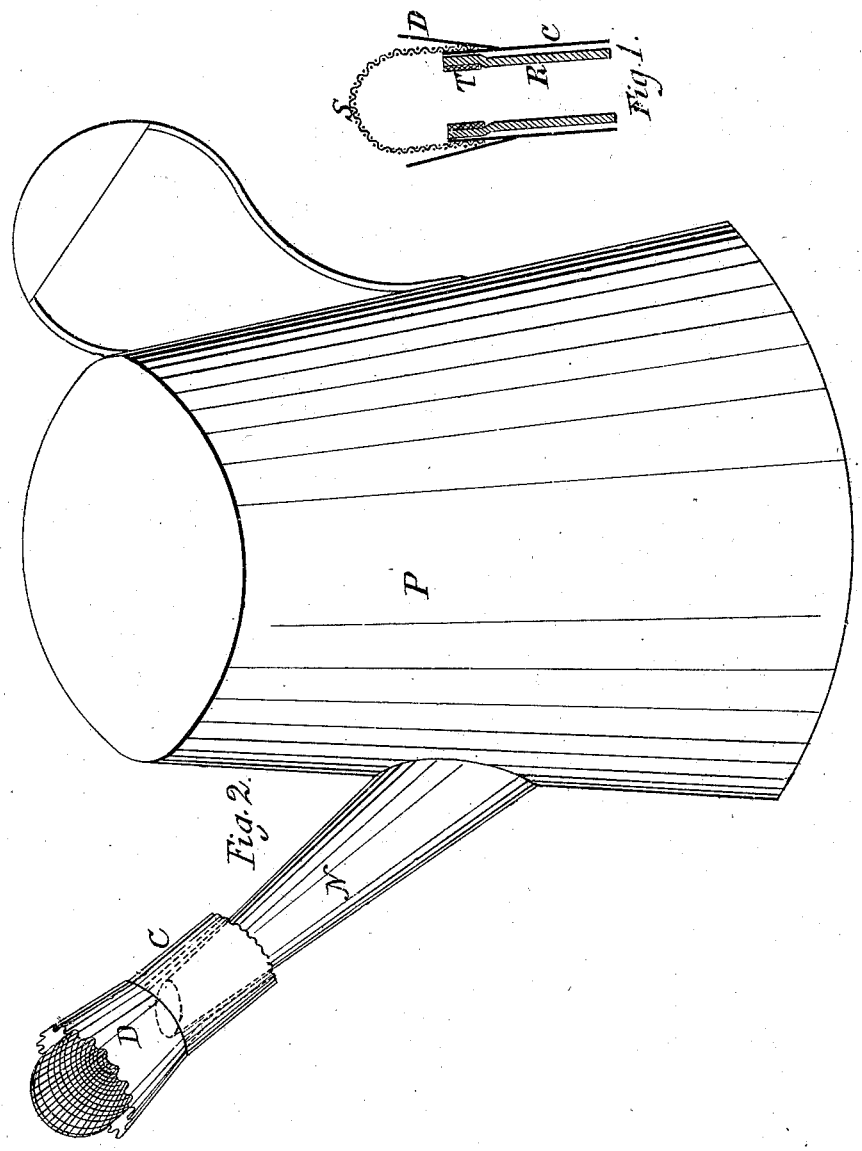

UNITED STATES PATENT OFFICE.

NATHAN AMES, OF SAUGUS CENTRE, ASSIGNOR TO HIMSELF AND J. C. WILDER, OF BOSTON, MASSACHUSETTS.

IMPROVED STRAINER FOR COFFEE AND TEA POTS.

Specification forming part of Letters Patent No. 33,316, dated September 17, 1861.

*To all whom it may concern:*

Be it known that I, NATHAN AMES, of Saugus Centre, in the county of Essex and Commonwealth of Massachusetts, have invented a new and useful Removable Strainer for Tea and Coffee Pots; and I do hereby declare that the following is a full, clear, and exact description of the construction and operation of the same, reference being had to the accompanying drawings, forming a part of this specification, in which—

Figure 1 is a longitudinal section, and Fig. 2 is a perspective view, of the strainer applied to a pot P.

Like parts are indicated by the same letters in both figures.

The nature of my invention consists, first, in constructing for tea and coffee pots a removable strainer consisting of a rubber or elastic tube R, provided with a termination S of wire-gauze or perforated metal, and which, owing to the elasticity of the tube, can readily be applied, so as to be water-tight, to nozzles of any size or shape, and as readily removed when required for the purpose of being rinsed or cleaned; second, in combining with said strainer S a flaring collar D to conduct the drippings of the strainer back into the nozzle N and prevent them from dropping onto the table, &c., and also to collect and assist in pouring the fluid from the strainer; and, third, in attaching to said strainer, collar, and tube a metallic casing C to cover and stiffen the tube and afford a convenient and ornamental handle to the utensil.

To enable others skilled in the art to make and use my invention, I will now proceed to describe its construction and operation.

R is a piece of elastic or vulcanized rubber pipe about one inch and a half in length and with a bore about five-eighths of an inch in diamter, more or less, so as to slip on, water-tight, over spouts or nozzles of various sizes, and either remain there or be readily removed when required for the purpose of being rinsed or cleaned.

T is a short piece of metallic tubing, the diameter of which is a little larger than the bore of the pipe R, into one end of which it is inserted, expanding the same, as represented in Fig. 1.

C is a cylinder, of tin or other suitable metal, into which the tube R is inserted, as represented in Fig. 1. The expanded end of R is intended to be a close fit in C, and by indenting the latter with a pointed punch on the outside over T the elastic tube is securely held in place. This casing C is enough larger than the tube R to admit the requisite expansion of the latter on a nozzle, as represented in Fig. 2.

S is the strainer, of wire-gauze or perforated metal, "struck up" in the usual manner, about the size and shape represented in the drawings. It is obvious, however, that the size and shape of the strainer may be varied at pleasure.

D (the use of which has been described above) is a flaring collar, of tin or other suitable metal, which is soldered to the casing C, as represented in Fig. 1. It is obvious, however, that D and C may be struck up in one piece, and the tube R may be attached to the outer as well as to the inner side. I prefer, however, the method shown in Fig. 1, as it covers the elastic tube, thereby making a neater looking article, as well as affording a convenient handle.

The open end of the strainer S is soldered either to the collar D or pipe C, or to both of them, as represented in Fig. 1.

Having thus described the nature and operation of my improvement, what I claim as my invention, and desire to secure by Letters Patent, is—

1. A removable strainer consisting of a rubber or elastic tube R, provided with a termination S of wire-gauze or perforated metal, substantially as described, and for the objects specified.

2. In combination with the strainer S, a flaring collar D, substantially as and for the purposes described.

3. The casing C, in combination with the strainer S, collar D, and elastic tube R, substantially as set forth, and for the object specified.

NATHAN AMES.

Witnesses:
D. A. AMES,
L. A. AMES.